Patented Aug. 14, 1945

2,382,732

UNITED STATES PATENT OFFICE 2,382,732

METHOD OF PRODUCING FOAM BATHS

Leo Löwenstein, Berlin-Wilmersdorf, Germany; vested in the Alien Property Custodian No Drawing. Application September 30, 1940, Serial No. 359,171. In Germany April 6, 1940

10 Claims. (Cl. 252—307)

The present invention relates to a method of producing foam baths.

As is well known, foam baths which are of considerable importance for various medical purposes are made in such a manner that hot water of a temperature of more than 40° C. containing a foam former, for instance saponine, is poured into a bathing tub to a height of 5–10 cm. and small air bubbles from a compresser are, by way of a distributing plate led through this water. This so-called air foam then has a temperature of 30–35° C. Such a foam, however, is very unstable, particularly at higher temperatures. It has, therefore, also been tried to obtain a better stability or permanence of the foam by incorporating solid particles.

The sanative or curative effects of the foam baths substantially depends on the heat accumulating effect of same. Due to this heat accumulating effect a sufficiently high temperature of the foam is maintained for a sufficient long duration of time, i. e. for the duration of a bath that is to say up to 20 minutes. Now, it has been found that from this point of view the above mentioned baths using air foam do not answer the purpose. It has already been proposed to embed alumina in the air foam used for bathing purposes in order to render the foam more stable. A useful result, particularly with regard to the heat accumulating effect, however, has not been obtained. Foam baths, based upon a chemical conversion, particularly baths with dry foam are more suitable.

A chemical preparation of foam without special devices is rendered possible by conversion of aluminium salt, particularly sulfate, with alkali carbonate, particularly sodium bicarbonate, which are inserted into water containing a foam former and then producing foam by the development of carbon dioxide. Hereby the following conversion is effected.

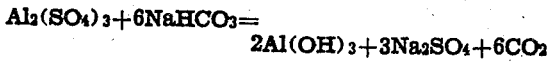

The aluminium hydroxide developed during this reaction is uniformly distributed in the form of a colloidal gel over all the walls of the foam structure and also between the individual bubbles.

For the production of a chemical foam bath it has also been proposed to use as much water only as may be practically retained by the finished foam, i. e. less than 300 cm.³ of water for 10 g. of $NaHCO_3$. This foam is more stable than the above mentioned foams even at higher temperatures. In such a foam, dry foam, temperatures up to 55° C. may be endured by a person taking the bath.

Now the invention relates to a method of producing foam which allows a particularly strong accumulation of heat or which has a very low heat conductivity respectively. According to the invention solid small particles and pulverized substances respectively are added to foam forming mixtures of aluminium sulfate and bicarbonate of sodium, whereupon, by stirring with a sufficient quantity of water of a corresponding temperature, a foam is obtained in which besides the aluminia gel the solid particles are incorporated. Only as much water is to be used as practically may be retained by the foam produced.

Moreover, preferably the amount of solid pulverized substances by weight should not exceed more than 40% of the weight of the $Al_2(SO_4)_3$ contained in the mixture. So for instance ordinary industrially pure alumina or alumina hydrate is admixed, not more than 40% of the $Al_2(SO_4)_3$ being contained in the mixture as powder of aluminium oxide or aluminium hydroxide. If then by stirring with water foam is produced by means of a foam former, for instance saponine, this foam is of considerably larger heat accumulating capacity than any one of the known foams proposed for the production of foam baths.

Instead of alumina, magnesium oxide or magnesium hydroxide may be added to the mixture. In place of these substances, other solid particles also may be embedded which by themselves are not heat conducting and are chemically inert with regard to the other constituents of the mixture. Pulverized bath muds, for instance fango, a material originating from the deposit of springs or of volcanic earths, river-, sea- or marine-mud, have proved to be particularly suitable. In all cases, however, it is necessary that in the mixture the quantity of $Al_2(SO_4)_3$ by weight is at least three times as large as the weight of the admixed solid substances. For the production of this foam no more water may, of course, be used as may be retained by the foam. The water used for producing the foam is not allowed to exceed a maximum quantity which amounts to 400 cm.³ for each 7 g. of $Al_2(SO_4)_3$. In the explanation, therefore, pure $Al_2(SO_4)_3$ without crystal water is supposed to be used.

Below some compositions of suitable mixtures for the production of such baths are given.

1

| | Grams |
|---|---|
| $Al_2(SO_4)_3.18$ aq | 1718 |
| $NaHCO_3$ | 1300 |
| $Al_2O_3$ | 195 |
| Saponine | 30 |

2

| | |
|---|---|
| $Al_2(SO_4)_3.18$ aq | 1718 |
| $NaHCO_3$ | 1300 |
| MgO | 77 |
| Saponine | 30 |

3

| | |
|---|---|
| $Al_2(SO_4)_3.18$ aq | 1718 |
| $NaHCO_3$ | 1300 |
| MgO | 154 |
| Saponine | 30 |

4

| | |
|---|---|
| $Al_2(SO_4)_3.18$ aq | 1718 |
| $NaHCO_3$ | 1300 |
| Fango | 195 |
| Saponine | 30 |

The mixtures are so chosen that about 190 liters of dry foam, i. e. foam practically without adherent water result from each 30 liters of water, i. e. the filling of an ordinary bathing-tub.

The mixtures contain 933 g. of $Al_2(SO_4)_3$. The total weight of the admixed powder, therefore, is not allowed to amount to more than 373 g. Otherwise the foam would considerably lose its stability and capacity of heat accumulation.

Now, these foams have been tested with regard to their capacity of heat accumulation. For this purpose the foam was filled into a glass bulb having a connecting socket. After filling the socket was closed by means of a perforated plug through which a thermometer extended into the bulb in such a manner that the mercury ball was situated in the centre of the glass bulb. The latter was totally dipped into a water bath the temperature of which could be maintained constant. The foams were filled in with a temperature of 12°, while the temperature of the water bath amounted to 50°. The rise of temperature in the bulb was then observed at various periods of time. The quicker the temperature rises to 50°, the better is the heat conductivity and the worse is the heat accumulation.

In the following table the temperatures of the four foams are indicated which are read off after 5, 10, 15 and 20 minutes respectively.

| | Temperature of foam in Celsius degrees after— | | | |
|---|---|---|---|---|
| | 5 minutes | 10 minutes | 15 minutes | 20 minutes |
| Foam 1, with 195 g. $Al_2O_3$ | 12 | 12 | 19 | 33 |
| Foam 2, with 77 g. MgO | 12 | 12 | 17 | 30 |
| Foam 3, with 154 g. MgO | 12 | 12 | 18 | 29 |
| Foam 4, with 195 g. fango | 12 | 12 | 20 | 31 |

For comparison the heat accumulation of the above mentioned known foams was measured under the same conditions. Air foam produced by forcing air into saponine containing water by means of a filter having small pores (tower of alumina ultra D) was examined. Further, air foams produced in the same manner, having solid particles incorporated, were tested. Before forming the foam 1,5 or 4 g. of $Al_2O_3$ or 1,2 g. of MgO were added into the suspension for each 100 cm.³ of water.

Moreover, a dry foam, as proposed already and obtained by the conversion of $Al_2(SO_4)_3.18H_2O$ with $NaHCO_3$ with a small quantity of water was examined.

An ordinary fango mud having 1,5 kg. of fango in 0,6 kg. of water also was examined.

| | Temperature of foam in Celsius degrees after— | | | |
|---|---|---|---|---|
| | 5 minutes | 10 minutes | 15 minutes | 20 minutes |
| Air foam | 35.7 | 50 | 50 | 50 |
| Air foam with 1.5 g. $Al_2O_3$ | 33.5 | 50 | 50 | 50 |
| Air foam with 4 g. $Al_2O_3$ | 35 | 50 | 50 | 50 |
| Air foam with 12 g. MgO | 32 | 50 | 50 | 50 |
| Dry foam obtained by conversion | 12 | 15 | 30 | 45 |
| Fango mud | 13 | 21 | 29 | 36 |

A comparison of the two tables shows that baths prepared in accordance with the method of the invention are, as far as their accumulation of heat is considered, far superior to hitherto known foam baths. They come, however, also up with fango.

It is still to be noted, that the foams produced in accordance with the method of the invention are, as far as stability comes into consideration, far superior to air foam and are at least of equal quality as dry foam. With regard to the latter, foams prepared according to the method of the invention have the advantage that they may cheaper be produced as for instance alumina is considerably cheaper than the corresponding amount of aluminium sulfate and bicarbonate, which are saved. Another advantage with regard to known dry foam baths consists in this that the packed mixture of the latter quickly forms lumps, whereas the new baths remain in the form of a powder for many months.

This progress over known foam baths also results in the superiority of the foam bath to the mud-bath. Such baths may be taken in special health resorts using complicated devices. Due to the high specific weight, the baths exert a higher pressure on a human's body than a water bath. The new foam bath, however, may very easily be taken in any bathing-tub even in private-houses. The pressure acting upon the body amounts to about a fraction of the pressure of an ordinary water bath only. Effective colloids and salts of the mud may easily be incorporated in the foam.

What I claim is:

1. In a method of producing foam baths the steps of taking a substantially stoichiometric mixture of crystallized aluminum sulfate, sodium bicarbonate of the proportions necessary to produce carbon dioxide and a substance capable of producing foam, adding solid small particles of a non-heat conducting substance chemically inert with regard to the other constituents of the mixture in a quantity not in excess of 40% by weight of the aluminum sulfate, and adding only as much water as may be retained by the foam produced.

2. In a method of producing foam baths the steps of adding solid small particles of alumina to a substantially stoichiometric mixture of crystallized aluminum sulfate and sodium bicarbonate of the proportions necessary to produce carbon dioxide the alumina to be added in a quantity not in excess of 40% by weight of the aluminum sulfate, incorporating a foam producing substance in the mixture, and adding only as much water as may be retained by the foam produced.

3. A method as claimed in claim 1, in which the maximum amount of water to be added to the mixture is 400 grams of water per 7 grams of aluminum sulfate.

4. In a method of producing foam baths the steps of adding solid small particles of alumina to a substantially stoichiometric mixture of crystallized aluminum sulfate and sodium bicarbonate of the proportions necessary to produce carbon dioxide, the total weight of the solid small particles not exceeding 40% of the weight of the aluminum sulfate, incorporating a foam producing substance in the mixture, and adding water of a maximum amount of 400 grams of water per 7 grams of aluminum sulfate.

5. A mixture for producing foam baths consisting of a substantially stoichiometric mixture of crystallized aluminum sulfate, a foam-stabilizing material and sodium bicarbonate, and an addition of solid pulverized non-heat conducting materials chemically inert with regards to the other constituents of the mixture the weight of the said solid pulverized material not to exceed 40% by weight of the aluminum sulfate.

6. A mixture as claimed in claim 5, in which pulverized alumina is the added material.

7. A method as claimed in claim 1 in which the solid pulverized material is magnesia.

8. A method as claimed in claim 1 in which the solid pulverized material is fango bath mud.

9. A mixture as claimed in claim 5, in which pulverized magnesia is the added material.

10. A mixture as claimed in claim 5, in which fango bath mud is the added material.

LEO LÖWENSTEIN.